US012780476B2

(12) United States Patent
Taguchi et al.

(10) Patent No.: US 12,780,476 B2
(45) Date of Patent: Nov. 3, 2026

(54) PACKAGED ITEM INSPECTION DEVICE AND PACKAGED ITEM INSPECTION METHOD

(71) Applicant: CKD CORPORATION, Aichi (JP)

(72) Inventors: Yukihiro Taguchi, Aichi (JP); Shiori Imaizumi, Aichi (JP); Shozo Oda, Aichi (JP)

(73) Assignee: CKD CORPORATION, Aichi (JP)

( * ) Notice: Subject to any disclaimer, the term of this patent is extended or adjusted under 35 U.S.C. 154(b) by 159 days.

(21) Appl. No.: 18/976,594

(22) Filed: Dec. 11, 2024

(65) Prior Publication Data

US 2025/0100735 A1 Mar. 27, 2025

Related U.S. Application Data

(63) Continuation of application No. PCT/JP2023/005400, filed on Feb. 16, 2023.

(30) Foreign Application Priority Data

Jul. 15, 2022 (JP) ................................ 2022-113637

(51) Int. Cl.
*G06K 9/00* (2022.01)
*B65B 57/02* (2006.01)
(Continued)

(52) U.S. Cl.
CPC ............. *B65B 57/02* (2013.01); *G01N 21/33* (2013.01); *G01N 21/95* (2013.01)

(58) Field of Classification Search
CPC ........ B65B 57/02; G01N 21/33; G01N 21/95; G01N 2021/8883; G01N 2021/8887;
(Continued)

(56) References Cited

FOREIGN PATENT DOCUMENTS

DE 3718616 A1 * 12/1987 ........... B65H 63/006
JP H10-137696 A 5/1998
(Continued)

OTHER PUBLICATIONS

International Preliminary Report on Patentablity issued in corresponding International Application No. PCT/JP2023/005400, mailed Dec. 18, 2024 (10 pages).
(Continued)

*Primary Examiner* — Xin Jia
(74) *Attorney, Agent, or Firm* — Osha Bergman Watanabe & Burton LLP

(57) ABSTRACT

A packaged item inspection device includes: an illumination device that irradiates the packaged item with ultraviolet light; an imaging device that images the ultraviolet light reflected from the packaged item and obtains regular reflection light image data of the packaged item; and a hardware processor that determines whether the packaging material in the packaged item is defective or non-defective, based on the regular reflection light image data, depending on presence or absence of any tear or break in the packaging material. The hardware processor further processes the regular reflection light image data by a binarization process and thereby obtains binarized image data, and upon determining that an area of a connected region of a dark portion in the binarized image data is greater than a preset reference value, outputs a result of determination indicating that the packaging material is defective due to the presence of the tear or break.

5 Claims, 8 Drawing Sheets

(51) Int. Cl.
*G01N 21/33* (2006.01)
*G01N 21/95* (2006.01)

(58) Field of Classification Search
CPC ........... G01N 21/8806; G01N 21/8851; G01N 21/909; G01N 21/88; G06T 7/00; G06V 10/82; G06V 20/52
See application file for complete search history.

(56) References Cited

FOREIGN PATENT DOCUMENTS

| | | | | | |
|---|---|---|---|---|---|
| JP | 2004-12294 | A | | 1/2004 | |
| JP | 2007-78540 | A | | 3/2007 | |
| JP | 2009192443 | A | * | 8/2009 | |
| JP | 2009-264800 | A | | 11/2009 | |
| JP | 2014-115185 | A | | 6/2014 | |
| KR | 20140100811 | A | * | 8/2014 | ........... G06T 7/0004 |
| KR | 20140100812 | A | * | 8/2014 | ........... G06T 7/0004 |
| WO | 2022/118523 | A1 | | 6/2022 | |

OTHER PUBLICATIONS

Notice of Reasons for Refusal issued in corresponding Japanese Application No. 2022-113637 mailed Jun. 6, 2023 (10 pages).
International Search Report issued in corresponding International Application No. PCT/JP2023/005400 mailed Apr. 25, 2023 (5 pages).
Written Opinion issued in corresponding International Application No. PCT/JP2023/005400 mailed Apr. 25, 2023 (4 pages).

* cited by examiner

PACKAGED ITEM INSPECTION DEVICE AND PACKAGED ITEM INSPECTION METHOD

BACKGROUND

Technical Field

The present disclosure relates to an inspection device for and an inspection method of performing an inspection for a packaged item, which is obtained by shrink-wrapping or stretch-wrapping an object item to be packaged, with a predetermined packaging material.

Description of Related Art

There are conventionally known packaged items, each being obtained by shrink wrapping or stretch-wrapping each of a variety of object items to be packaged, such as a food item, a cosmetic item, a medicinal item or a daily supply, with a predetermined packaging material. Such packaged items are widely used in terms of protection of the object item to be packaged, improvement in convenience in handling of the object item to be packaged, and improvement in designability. The packaged item may be, for example, a full-covered type obtained by covering the entirety of the object item to be packaged, with a packaging material or a partly-covered type obtained by covering part of the object item to be packaged, with a packaging material.

The occurrence of a damage such as a tear or a break in the packaged item is likely to cause various problems, for example, insufficient protection of the object item to be packaged and reduction of the convenience and the designability. Accordingly, there is a need to perform an inspection for the presence or the absence of any tear, break or the like in the packaging material, for example, prior to shipping of the product (packaged item).

A known inspection device configured to perform an inspection for a tear, a break or the like in a label used for covering an object item to be packaged uses a label provided with an ultraviolet light absorbing function, irradiates the label with light including ultraviolet light as inspection light, and performs an inspection for the presence or the absence of any tear, break or the like in the label by utilizing an image (fluorescence image) based on fluorescence from the label (as described in, for example, Patent Literature 1). This inspection device is allowed to perform an inspection for the presence or the absence of any tear, break or the like in the label by utilizing the disappearance of the fluorescence in a damaged location of the label having a tear, a break or the like.

Patent Literature

Patent Literature 1: Japanese Patent No. 2004-12294A

In order to use the inspection device described above for the inspection of the packaged item, there is a need to provide the packaging material with an ultraviolet light absorbing function. Purposely providing the ultraviolet light absorbing function for the purpose of inspection is, however, likely to increase the manufacturing cost of the product (packaged item).

Furthermore, in a fluorescence image is likely to have a small difference in contrast between a normal location and a damaged location in the packaging material and is also likely to cause "blurring" at a boundary between the normal location and the damaged location. There is accordingly a difficulty in obtaining a sharp image for the inspection. This is likely to cause an insufficient accuracy of the inspection.

SUMMARY

By taking into account the circumstances described above, one or more embodiments of the present disclosure provide a packaged item inspection device and a packaged item inspection method that enable a break, a tear or the like of a packaging material to be detected with higher accuracy without using any special packaging material having an ultraviolet absorbing function.

The following describes each of various aspects of the present disclosure. Functions and advantageous effects that are characteristic of each of the aspects are also described as appropriate.

Aspect 1. There is provided a packaged item inspection device that inspects a packaged item obtained by shrink-wrapping or stretch-wrapping an object item with packaging material made of thermoplastic resin material, the object item having an outer surface rougher than an outer surface of the packaging material. The packaged item inspection device comprises: an irradiation unit (i.e., illumination device) that irradiates the packaged item with ultraviolet light; an imaging unit (i.e., imaging device) that images the ultraviolet light reflected from the packaged item and obtains regular reflection light image data of the packaged item; and a determination unit (i.e., hardware processor) that determines whether the packaging material in the packaged item is defective or non-defective, based on the regular reflection light image data, depending on presence or absence of any tear or break in the packaging material. The hardware processor processes the regular reflection light image data by a binarization process and thereby obtains binarized image data, and upon determining that an area of a connected region of a dark portion in the binarized image data is greater than a preset reference value, outputs a result of determination indicating that the packaging material is defective due to the presence of the tear or break.

In the configuration of above Aspect 1, the outer surface of the object item is thought to be rougher than the outer surface of the packaging material. Accordingly, in the regular reflection light image data obtained by imaging of the packaged item in the state that the packaged item is irradiated with ultraviolet light, a damaged location having a tear, a break or the like (a part where the outer surface of the object item is exposed) is relatively dark, whereas a normal location is relatively bright. The configuration of above Aspect 1 determines whether the packaging material in the packaged item is defective or non-defective, based on such differences occurring in the regular reflection light image data. This configuration thus enables an inspection for the presence or the absence of any break, tear or the like in the packaging material to be performed without using any special material having an ultraviolet absorbing function. This accordingly suppresses an increase in manufacturing cost of the product (the packaged item).

Furthermore, the configuration of above Aspect 1 utilizes the regular reflection light image data, so as to provide a relatively large difference in contrast between the normal location and the damaged location in the packaging material and more effectively prevent the occurrence of "blurring" at a boundary between the normal location and the damaged location. This configuration enables a sharp image for the inspection to be obtained more certainly and thereby ensures a detection of any break, tear or the like in the packaging material with the higher accuracy.

Examples of the thermoplastic resin material used for making the packaging material include, polypropylene (PP), polyethylene (PE), polyolefin (PO) polyvinyl chloride (PVC), polyvinylidene chloride (PVDC), polystyrene (PS), polyethylene terephthalate (PET), polymethylpentene (PM) and linear low-density polyethylene (LLDPE).

Aspect 2. In the packaged item inspection device described in above Aspect 1, at least one of the irradiation unit and the imaging unit may be movable relative to the packaged item, and the imaging unit may image the packaged item multiple times while at least one of the irradiation unit and the imaging unit is moving relative to the packaged item, and thereby obtains pieces of luminance image data including information on luminance values at locations in the packaged item. The packaged item inspection device may set, as a luminance value of each of the locations in the packaged item, a highest luminance value among luminance values at an identical location in the packaged item indicated by the pieces of luminance image data, and generate the regular reflection light image data using the set luminance value.

The configuration of above Aspect 2 enables the more accurate regular reflection light image data to be obtained relatively easily. This further improves the accuracy of the inspection for the packaging material.

In the configuration of above Aspect 2, the irradiation unit and the imaging unit are provided corresponding to a conveyance path of the packaged item. In the configuration that the irradiation unit and the imaging unit are movable relative to the packaged item, imaging of the packaged item during conveyance of the packaged item ensures the higher efficiency of the inspection. This more effectively suppresses an increase in cost relating to the manufacture.

Aspect 3. In the packaged item inspection device described in above Aspect 1, the irradiation unit may be shadowless illumination having ultraviolet light sources.

The configuration of above Aspect 3 enables the regular reflection light image data with regard to the packaged item to be obtained by a relatively small number of imaging operations (for example, by only one imaging operation). This configuration reduces the processing load for obtaining the regular reflection light image data. This configuration also increases the speed of the inspection and thereby improves the productivity.

Aspect 4. In the packaged item inspection device described in above Aspect 1, the determination unit may be configured to process the regular reflection light image data by a binarization process and thereby obtain binarized image data, and when an area of a connected region of a dark portion in the binarized image data is greater than a preset reference value, the determination unit may be configured to determine that the packaging material is defective.

The configuration of above Aspect 4 utilizes the area of the connected region of the dark portion to perform the good/poor quality judgment of the packaging material. This configuration more certainly prevents a shadow caused by fine "crinkles" present in the packaging material from being falsely detected as a defective part. As a result, this furthermore improves the accuracy of the inspection.

Aspect 5. In the packaged item inspection device described in above Aspect 1, may further comprise: a neural network that comprises an encoder portion extracting a feature quantity from input image data, and a decoder portion reconfiguring image data from the feature quantity; and a generation model generated by training the neural network using, as learning data, the regular reflection light image data with regard to a non-defective packaged item. The hardware processor further: obtains reconfiguration image data that are image data reconfigured by inputting, as original image data, the regular reflection light image data obtained by the imaging device into the generation model; and outputs a result of determination as to whether the packaging material is defective or non-defective based on a result of comparison between the original image data and the reconfiguration image data.

The "regular reflection light image data with regard to the non-defective packaged item" used as the "learning data" described above may be, for example, regular reflection light image data with regard to non-defective defective packaged items which have been accumulated by previous inspections, regular reflection light image data with regard to non-defective packaged items which are visually selected by an operator, or virtual non-defective image data which are generated by using the foregoing image data or the like.

The "neural network" described above includes, for example, a convolution neural network having convolution layers. The "learning" described above includes, for example, deep learning. The "identification unit (generation model)" described above includes, for example, an autoencoder and a convolution autoencoder.

Additionally, the "identification unit" is generated by learning using only the regular reflection light image data with regard to the non-defective packaged item. Accordingly, reconfiguration image data generated by inputting original image data with regard to a defective packaged item into the identification unit is substantially consistent with original image data with exclusion of a noise part (a defective part). In the case where a packaged item has a defective part, virtual image data of regular reflection light with regard to the packaged item on the assumption of the absence of any defective part is accordingly generated as the reconfiguration image data.

The configuration of above Aspect 5 compares the original image data with the reconfiguration image data, which is reconfigured by inputting the original image data into the identification unit, and determines whether the packaging material is defective or non-defective, based on the results of the comparison. The two image data to be compared with each other pertain to one identical packaged item. The two image data to be compared with each other accordingly have substantially identical shapes and appearances of the packaged item. This configuration does not need to set relatively loose determination conditions with the purpose of preventing false detection due to the differences in shape and appearance, but allows the stricter determination conditions to be set. Furthermore, this configuration enables identical conditions for obtaining image data (for example, the position and the angle of the packaged item placed relative to a camera, the light/dark state, and the angle of view of the camera) to be set for the two image data to be compared with each other. As a result, this configuration achieves the extremely high accuracy of the inspection.

Aspect 6. There is provided a packaged item inspection method of inspecting a packaged item obtained by shrink-wrapping or stretch-wrapping an object item with packaging material made of a predetermined thermoplastic resin material, the object item having an outer surface rougher than an outer surface of the packaging material. The packaged item inspection method comprises: irradiating the packaged item with ultraviolet light; imaging the ultraviolet light reflected from the packaged item and obtaining regular reflection light image data of the packaged item; and determining whether the packaging material in the packaged item is defective or non-defective, based on the regular reflection light image data, depending on presence or absence of any tear or break in the packaging material. The determining further includes: processing the regular reflection light image data by a binarization process and thereby obtaining binarized image data, and upon determining that an area of a connected region of a dark portion in the binarized image data is greater than a preset reference value, outputting a result of determination indicating that the packaging material is defective due to the presence of the tear or break.

The configuration of above Aspect 6 has similar functions and advantageous effects to those of Aspect 1 described above.

The technical features described above in the respective aspects may be combined appropriately. For example, the technical features with regard to above Aspect 2 or above Aspect 3 may be combined with the technical features with regard to above Aspect 4 or above Aspect 5. In another example, each of the technical features with regard to above Aspects 2 to 5 may be applied appropriately to above Aspect 6.

DETAILED DESCRIPTION OF EMBODIMENTS

The following describes embodiments with reference to drawings. A packaged item 1 as an inspection object is described first.

Figure 1:
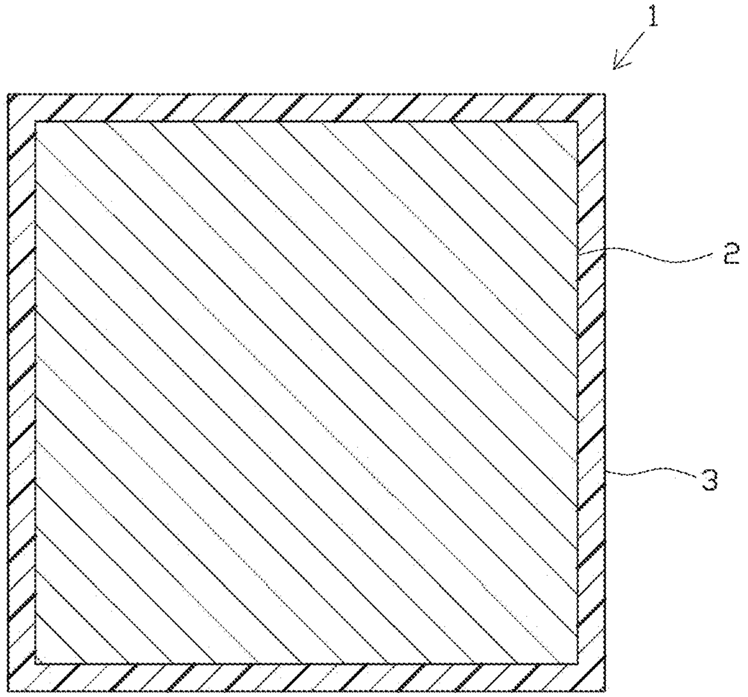
FIG. 1 is a schematic sectional view illustrating a packaged item.
Figure 2:
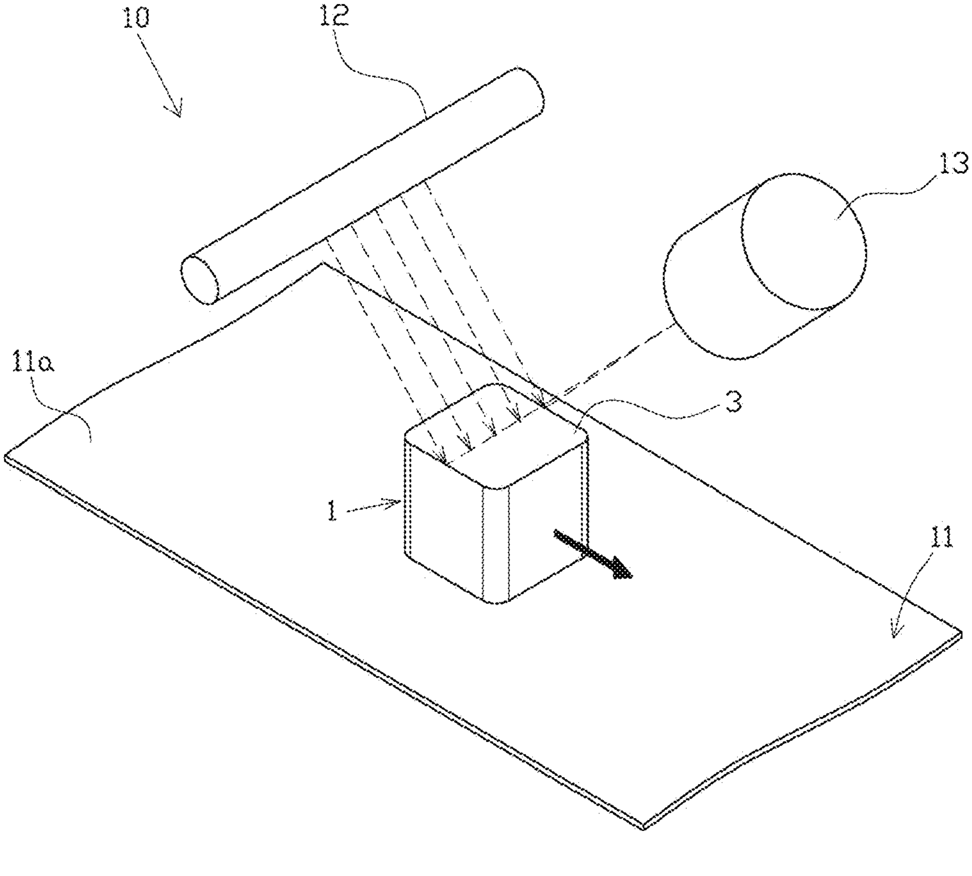
FIG. 2 is a schematic perspective view illustrating a packaged item inspection device.

As shown in FIGS. 1 and 2, the packaged item 1 is manufactured by shrink wrapping or stretch-wrapping an object item to be packaged 2 with a packaging material 3. As a matter of convenience, the packaging material 3 is expressed to be excessively thicker than the actual state in FIG. 1 and other drawings.

The object item to be packaged 2 may be, for example, a food item, a cosmetic item, a medicinal item, a daily supply, an electric appliance, a book or the like. The object item to be packaged 2 is, however, naturally not limited to these examples. The object item to be packaged 2 is provided with a box or a case made of, for example, a paper material or a resin material to place a content therein. This box or case may form an outer surface of the object item to be packaged 2. According to the embodiment, the entire outer surface of the object item to be packaged 2 is covered with the packaging material 3. The packaged item 1 may be obtained by partly covering part of the outer surface of the object item to be packaged 2 with the packaging material 3.

Additionally, the outer surface of the object item to be packaged 2 is not a mirror plane but has a higher roughness than the roughness of an outer surface of the packaging material 3. The roughness of each of the outer surfaces of the object item to be packaged 2 and of the packaging material 3 may be measured by, for example, utilizing a calculated average roughness Ra.

The packaging material 3 is a sheet (film) made of a predetermined thermoplastic resin material and has at least the outer surface formed to be a smooth surface. Available examples of the thermoplastic resin material used for the packaging material 3 include PPE, PE, PO, PVC, PVDC, PS, PET, PMP and LLDPE.

The following describes the schematic configuration of a packaged item inspection device 10 configured to perform an inspection for the packaged item 1 described above and more specifically the packaging material 3 thereof.

Figure 3:
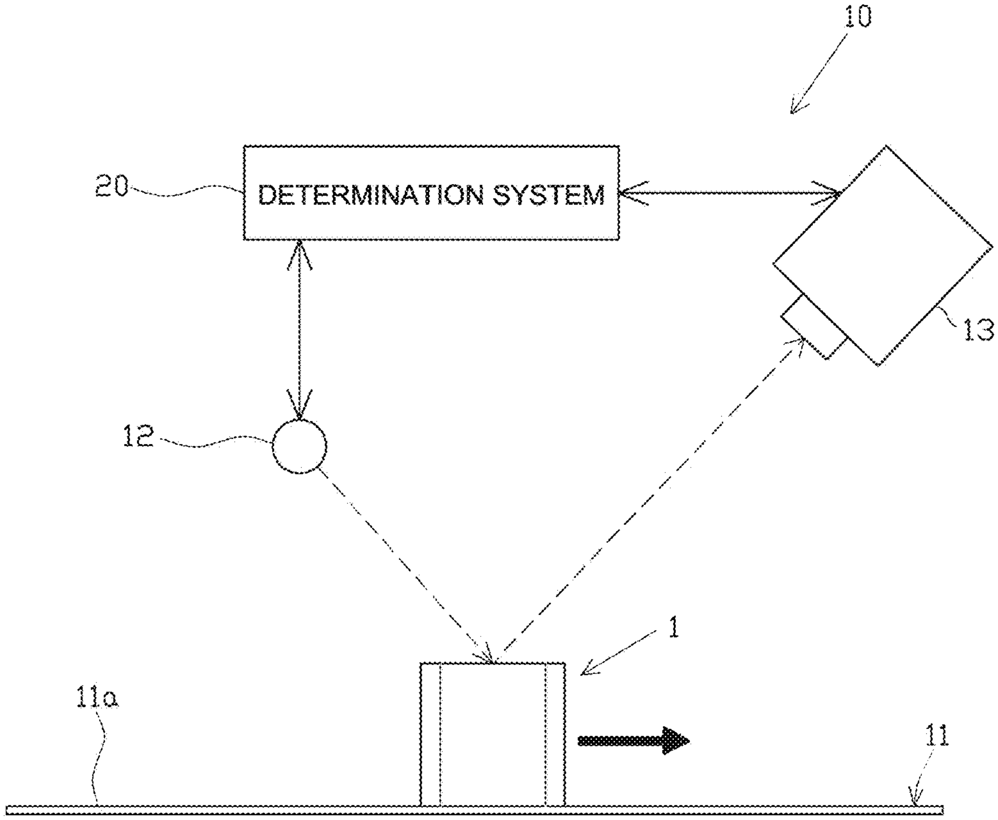
FIG. 3 is a schematic front view illustrating the packaged item inspection device.

As shown in FIGS. 2 and 3, the packaged item inspection device 10 includes a conveying device 11, an illumination device 12, a line sensor camera 13 and a determination system (or processing device) 20. According to the embodiment, the illumination device 12 configures the "illumination unit", and the line sensor camera 13 configures the "imaging unit" or "imaging device".

The conveying device 11 is a device configured to convey the packaged item 1 to a predetermined post-process device (for example, a boxing device) or the like). The conveying device 11 includes, for example, a conveyance belt 11*a* which the packaged item 1 is placed on and is configured to continuously convey the packaged item 1 at a fixed speed in a horizontal direction by moving the conveyance belt 11*a*. The conveyance of the packaged item 1 by the conveying device 11 accordingly causes both the illumination device 12 and the line sensor camera 13 to be moved relative to the packaged item 1.

The conveying device 11 is provided with a non-illustrated defective discharge mechanism. In response to input of a predetermined defective signal from the determination system 20, the packaged item 1 determined as a defective is discharged out of the system (out of a conveyance path of the packaged item 1) by the defective discharge mechanism. This configuration prevents the packaged item 1 as the defective from being conveyed to the post-process device described above.

The illumination device 12 and the line sensor camera 13 are respectively located above the conveying device 11 and are placed corresponding to the conveyance path of the packaged item 1.

The illumination device 12 is configured to irradiate a predetermined area on an upper surface of the conveying device 11 (the conveyance belt 11*a*), i.e., on a plane which the packaged item 1 is placed on, with ultraviolet light that is emitted from obliquely above the predetermined area. This configuration causes the packaged item 1 conveyed to the predetermined area to be irradiated with the ultraviolet light that is emitted from obliquely above the predetermined area by the illumination device 12. The emitted ultraviolet light herein has a spread in a width direction of the conveying device 11 (in a direction perpendicular to a conveyance direction of the packaged item 1). According to the embodiment, the process of irradiating the packaged item 1 with ultraviolet light by the illumination device 12 corresponds to the "irradiation process".

The line sensor camera 13 is placed at such a position that the predetermined area in the conveying device 11 is placed between the illumination device 12 and the line sensor camera 13 in planar view. The line sensor camera 13 has a line sensor including a plurality of detection elements, which are arranged in a line and which are configured to detect the ultraviolet light. The line sensor camera 13 is configured to allow for imaging (exposure) of the ultraviolet light that is reflected from the packaged item 1. According to the embodiment, image data obtained by the line sensor camera 13 are luminance image data having luminance values varying according to the detection output of the line sensor.

The line sensor camera 13 is also configured to perform imaging of the ultraviolet light reflected from the packaged item 1 multiple times in the state that the packaged item 1 is conveyed (i.e., in the state that both the illumination device 12 and the line sensor camera 13 are moved relative to the packaged item 1). This configuration accordingly obtains a plurality of pieces of luminance image data including information on luminance values at a plurality of locations in the packaged item 1. According to the embodiment, the process of imaging the ultraviolet light reflected from the packaged item 1 by the line sensor camera 13 corresponds to the "imaging process".

Figure 4:
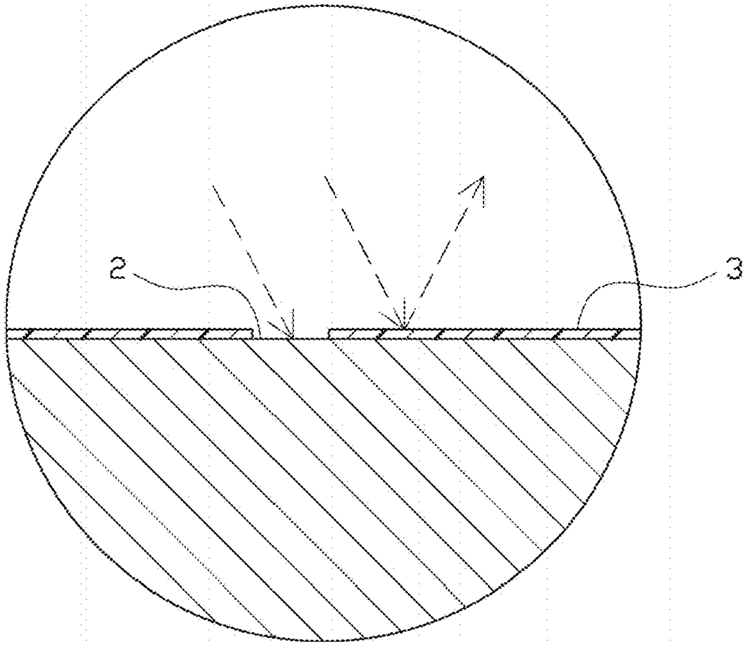
FIG. 4 is a schematic view illustrating a difference in reflection state of ultraviolet light between the presence and the absence of any damaged location in a packaging material.

The ultraviolet light which a normal location in the packaging material 3 is irradiated with, is regularly reflected (reflected at a reflection angle equal to an incidence angle) by the packaging material 3, so that the regular reflection ultraviolet light enters the line sensor camera 13. The ultraviolet light which a damaged location (a location having a break, a tear or the like) in the packaging material 3 is irradiated with, is, on the other hand, not regularly reflected by the packaging material 3, so that no regular reflection ultraviolet light enters the line sensor camera 13 (respectively shown in FIG. 4). Accordingly, in the obtained luminance image data, a part (pixel) corresponding to the normal location has a light luminance value, while a part corresponding to the damaged location has a low luminance value.

Every time the packaged item 1 is conveyed by a predetermined amount, the luminance image data obtained by the line sensor camera 13 is converted into a digital signal (image signal) inside of the line sensor camera 13 and is output in the form of the digital signal to the determination system 20 (to a regular reflection light image data generator 24 described later).

According to the embodiment, the imaging timing of the line sensor camera 13 is set, such that a present target imaging area of the packaged item 1 that is currently imaged by the line sensor camera 13 partly overlaps a previous target imaging area of the packaged item 1 that is previously imaged by the line sensor camera 13. Accordingly, one pixel at predetermined coordinates in a plurality of pieces of luminance image data continuously obtained is configured to at least partly overlap a predetermined location in the packaged item 1 (a one-pixel area in a region occupied by the packaged item 1 in regular reflection light image data described later) and to gradually shift downstream little by little in the conveyance direction of the packaged item 1. According to the embodiment, each of the plurality of pieces of luminance image data continuously obtained accordingly has a pixel corresponding to (overlapping) one certain pixel in the regular reflection light image data. The luminance of the one certain pixel in the regular reflection light image data is set to a highest luminance value among respective luminance values shown by a plurality of pixels in the plurality of pieces of luminance image data, which respectively correspond to the one certain pixel, as described later.

The determination system 20 is configured by a computer or hardware processor including, for example, a CPU (Central Processing Unit) that executes predetermined arithmetic operations, a ROM (Read Only Memory) that stores a variety of programs, fixed value data and the like, a RAM (Random Access Memory) that temporarily stores a variety of data in relation to execution of various arithmetic operations, and peripheral circuits thereof; an input/output device; a display device; and the like.

Figure 5:
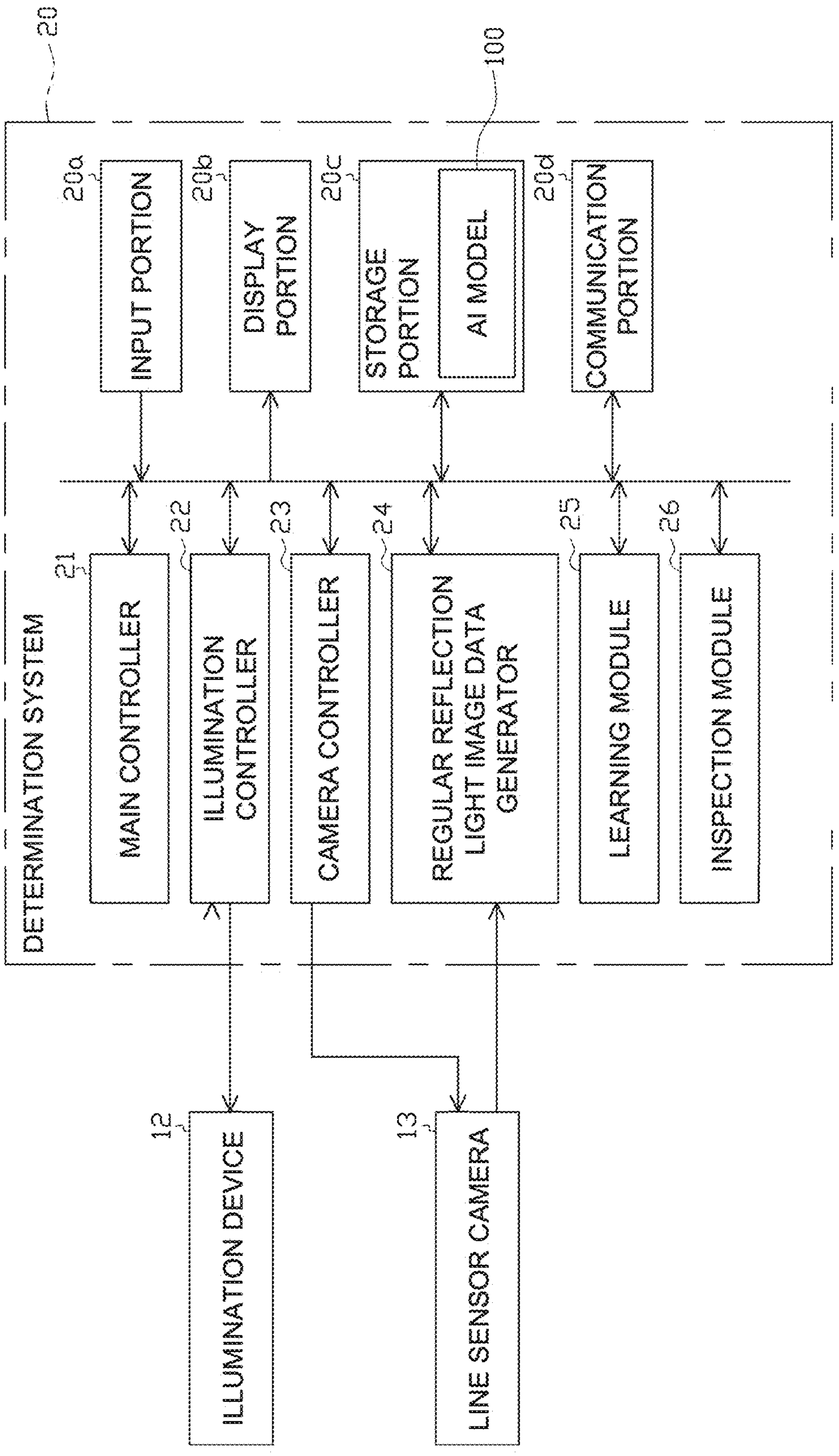
FIG. 5 is a block diagram illustrating the functional configuration of the packaged item inspection device.

When the CPU operates according to the variety of programs, as shown in FIG. 5, the determination system 20 serves as various function modules including a main controller 21, an illumination controller 22, a camera controller 23, a regular reflection light image data generator 24, a learning module 25, and an inspection module 26 described later. According to the embodiment, the regular reflection light image data generator 24 configures the "regular reflection light image data generation unit".

The respective function modules described above are, however, implemented by cooperation of the various hardware components, such as the CPU, the ROM and the RAM described above. There is no need to clearly distinguish the functions implemented by the hardware configuration and the functions implemented by the software configuration from each other. Part or the entirety of these functions may be implemented by a hardware circuit, such as an IC.

The determination system 20 is further provided with, for example, an input portion (or input device) 20*a* that is configured by a keyboard and a mouse, a touch panel or the like; a display portion (or display device) 20*b* that is configured by a liquid crystal display or the like and that is provided with a display screen to display various pieces of information; a storage portion (or storage) 20*c* that is configured to store a variety of data and programs, the results of arithmetic operations, the results of inspection, and the like; and a communication portion 20*d* that is configured to send and receive a variety of data from and to the outside.

The following describes the above respective function modules configuring the determination system 20 more in detail.

The main controller 21 is a function module configured to control the entire determination system 20 and to send and receive various signals to and from other function modules including the illumination controller 22 and the camera controller 23.

The illumination controller 22 is a function module configured to control the illumination device 12, in response to a command signal from the main controller 21.

The camera controller 23 is a function module configured to control the line sensor camera 13 and more specifically to control, for example, an imaging timing by the line sensor camera 13, in response to a command signal from the main controller 21. The camera controller 23 controls an imaging timing by the line sensor camera 13, such that a present target imaging area of the packaged item 1 by the line sensor camera 13 partly overlaps a previous target imaging area of the packaged item 1 by the line sensor camera 13.

The regular reflection light image data generator 24 is configured to generate regular reflection light image data with regard to one packaged item 1 by using a plurality of pieces of luminance image data in relation to the packaged item 1 obtained from the line sensor camera 13.

More specifically, the regular reflection light image data generator 24 first obtains a highest luminance value among a plurality of luminance values with regard to one identical location (one certain pixel in eventually obtained regular reflection light image data), which are respectively shown by a plurality of pieces of luminance image data. For example, when each of three luminance image data respectively has one pixel corresponding to the one certain pixel, the regular reflection light image data generator 24 obtains a highest luminance value among three luminance values respectively shown by these three pixels. The one identical location herein includes one identical location in the packaged item 1.

The regular reflection light image data generator 24 subsequently performs a process of setting the obtained highest luminance value to the luminance of the one identical location described above (the one certain pixel in the eventually obtained regular reflection light image data), with respect to each of the pixels in the eventually obtained regular reflection light image data. This process is accordingly repeated with respect to each location of the packaged item 1 (with respect to each of the pixels included in a region occupied by the packaged item 1 in the eventually obtained regular reflection light image data). The regular reflection light image data generator 24 accordingly sets the luminances of all the pixels in the regular reflection light image data as described above, so as to generate regular reflection light image data with regard to the packaged item 1 (including information on the packaged item 1). According to the embodiment, the generated regular reflection light image data is image data in a rectangular shape including the entire area of the upper surface of the packaged item 1.

The configuration of this embodiment utilizes all the pixels of the luminance image data which include other areas as well as the region occupied by the packaged item 1, to generate the regular reflection light image data with regard to the packaged item 1. A modified configuration may extract only the region occupied by the packaged item 1 from the luminance image data and may utilize only the pixels included in this region to generate the regular reflection light image data with regard to the packaged item 1.

Figure 6:
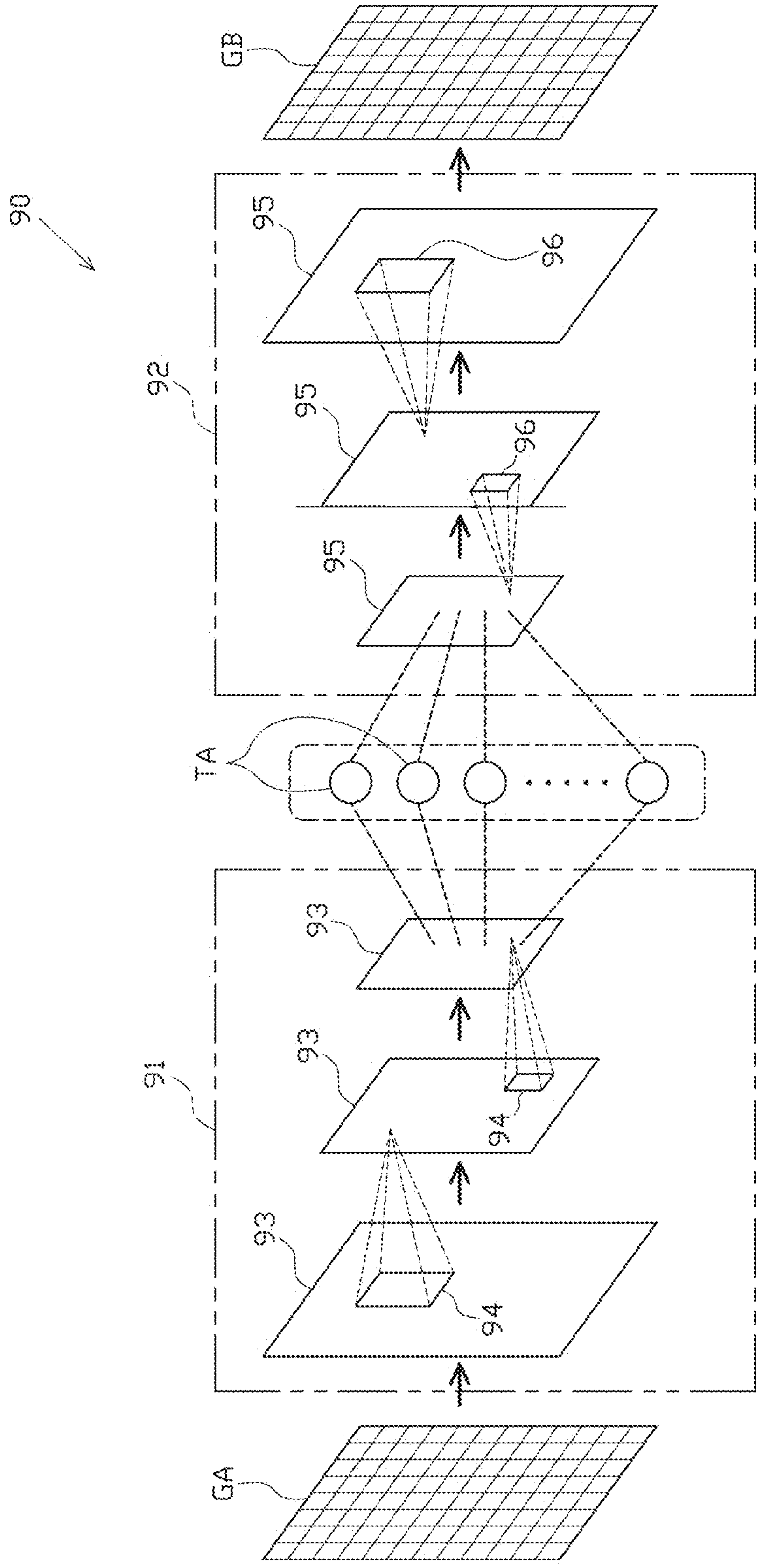
FIG. 6 is a schematic diagram illustrating the structure of a neural network.

The learning module 25 is a function module configured to perform learning of a deep neural network 90 (hereinafter simply referred to as the "neural network 90": as shown in FIG. 6) by using learning data and to construct an AI (Artificial Intelligence) model 100 serving as the "identification unit".

The AI model 100 according to the embodiment is a generation model constructed by deep learning of the neural network 90 (or by the neural network 90 that has been trained) using only image data with regard to the non-defective packaged item 1 as learning data as described later and has a so-called autoencoder structure.

The structure of the neural network 90 is described with reference to FIG. 6. FIG. 6 is a schematic diagram conceptually illustrating the structure of the neural network 90. The neural network 90 has the configuration of a convolutional autoencoder (CAE) including an encoder portion 91 serving as an "encoding unit" configured to extract a feature quantity (latent variable) TA from input image data GA and a decoder portion 92 serving as a "decoding unit" configured to reconstruct image data GB from the feature quantity TA.

The configuration of the convolutional autoencoder is publicly known, so that the detailed description thereof is omitted. The encoder portion 91 has a plurality of convolution layers 93. Each of the convolution layers 93 is configured to output the results of convolution operations of input data using a plurality of filters (kernels) 94, as input data for a subsequent layer. Similarly, the decoder portion 92 has a plurality of deconvolution layers 95. Each of the deconvolution layers 95 is configured to output the results of deconvolution operations of input data using a plurality of filters (kernels) 96, as input data of a subsequent layer. The learning process described later updates weights (parameters) of the respective filters 94 and 96.

The inspection module 26 is a function module configured to perform good/poor quality judgment for the packaging material 3 in the packaged item 1 that is conveyed by the conveying device 11. According to the embodiment, for example, the inspection module 26 performs an inspection to determine whether the packaging material 3 has any damage, such as a break, a tear or the like. In the case where the packaging material 3 has a printed area, the inspection module 26 may perform good/poor quality judgment for the printed area. According to the embodiment, the inspection module 26 configures the "determination unit".

The display portion **20*b* is placed, for example, in the vicinity of the conveying device 11 and is configured to display various pieces of information stored in the storage portion 20*c*. The display portion 20*b* is thus allowed to display, for example, various image data, such as luminance image data, information used for the inspection, and the results of the good/poor quality judgment for the packaging material 3**.

The storage portion **20*c* is configured by, for example, an HDD (Hard Disk Drive), an SSD (Solid State Drive) or the like and has a predetermined storage area to store, for example, the AI model 100 (the neural network 90 and learning information obtained by learning thereof). The storage portion 20*c* also has a function of storing various image data, information used for the inspection (for example, a variety of threshold values and reference values), and the results of the good/poor quality judgment for the packaging material 3 performed by the inspection module 26**.

The communication portion **20*d* is provided with, for example, a wireless communication interface in conformity with communication standards, such as a wired LAN (Local Area Network) and a wireless LAN and is configured to send and receive various data to and from the outside. For example, a defective signal based on the results of the good/poor quality judgment performed by the inspection module 26 is output via the communication portion 20*d*** to the outside (for example, the defective discharge mechanism).

Figure 7:
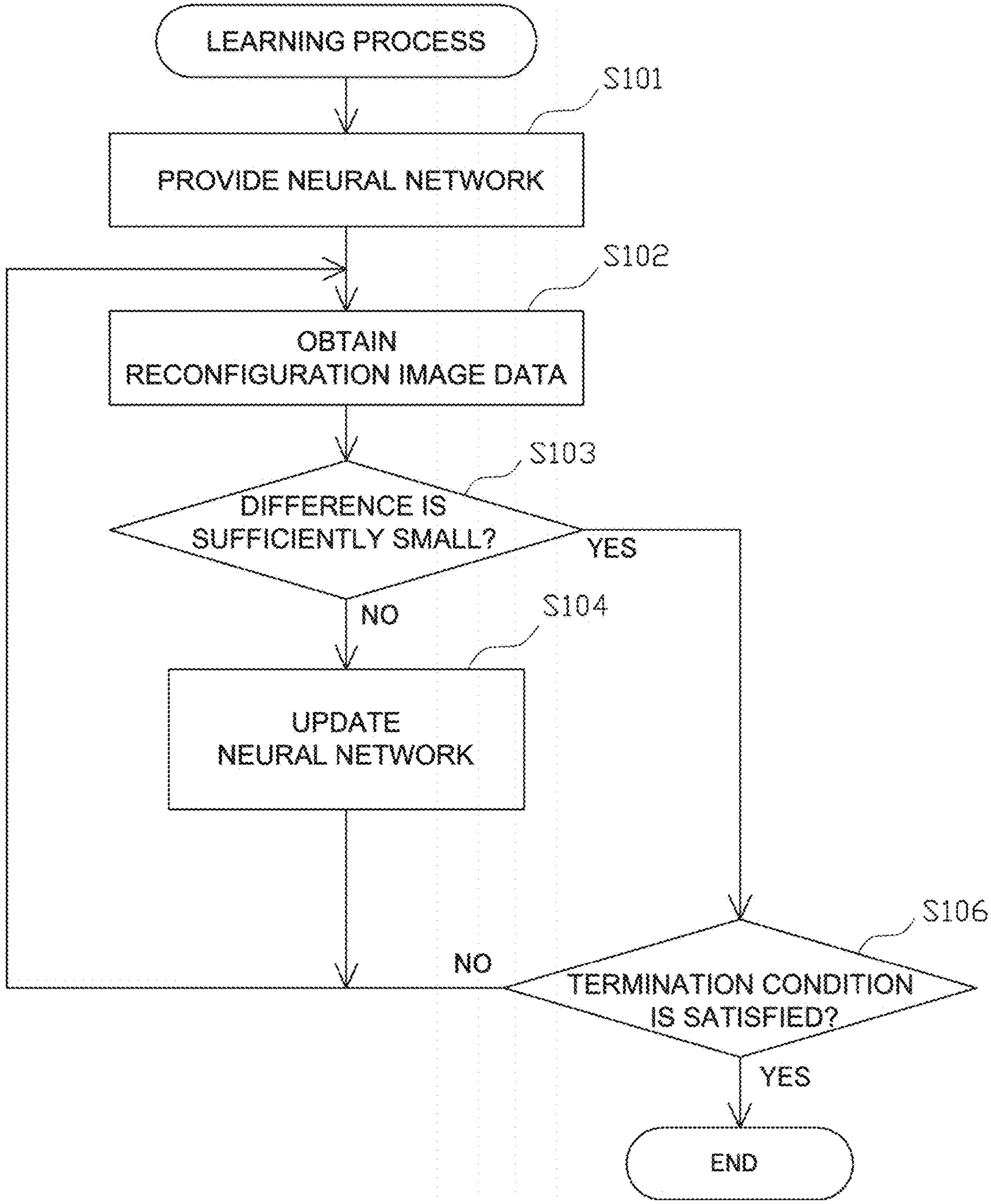
FIG. 7 is a flowchart showing the flow of a learning process of the neural network.

The following describes a learning process of the neural network 90 performed by the determination system 20 with reference to the flowchart of FIG. 7.

When the learning process is started by execution of a predetermined learning program, the main controller 21 first provides a neural network 90 that has not yet been learnt, at step S101. For example, the main controller 21 reads out a neural network 90 that is stored in advance in a predetermined storage device or the like. In another example, the main controller 21 constructs a neural network 90, based on network configuration information (for example, the number of layers of the neural network and the number of nodes in each layer) that is stored in the storage device or the like.

At step S102, the learning process subsequently obtains reconfiguration image data. More specifically, the learning process gives learning data provided in advance as input data to an input layer of the neural network 90 and then obtains reconfiguration image data output from an output layer of the neural network 90. The learning data herein may be, for example, regular reflection light image data with regard to non-defective packaged items 1 which have been accumulated by previous inspections, regular reflection light image data with regard to non-defective packaged items 1 which are visually selected by an operator, or virtual non-defective image data which are generated by using the foregoing image data or the like.

At subsequent step S103, the learning process compares the learning data with the reconfiguration image data output from the neural network 90 at step S102 and determines whether a difference therebetween is sufficiently small (whether the difference is equal to or less than a predetermined reference value).

When the difference is sufficiently small, the learning process subsequently determines whether a termination condition of the learning process is satisfied at step S105. It is determined that the termination condition is satisfied, for example, in the case where an affirmative answer is continually given a predetermined number of times at step S103 without proceeding to the processing of step S104 described later or in the case where the learning operation using the entirety of the provided learning data is repeated a predetermined number of times. When the termination condition is satisfied, the learning process stores the neural network 90 and the learning information thereof (updated parameters and the like described later), as the AI model 100, into the storage portion 20*c* and is then terminated.

When the termination condition is not satisfied at step S105, on the other hand, the learning process returns to step S102 to perform learning of the neural network 90 again.

When the difference is not sufficiently small at step S103, the learning process performs a network updating process (learning of the neural network 90) at step S104 and then goes back to step S102 to repeat the series of processing described above.

The network updating process at step S104 uses a known learning algorithm, for example, an error backpropagation method, and updates the weights (parameters) of the respective filters 94 and 96 described above in the neural network 90 to more appropriate values, such as to minimize a loss function that represents a difference between the learning data and the reconfiguration image data. For example, BCE (Binary Cross-entropy) may be used as the loss function.

Repeating the processing of steps S102 to S104 multiple times minimizes the difference between the learning data and the reconfiguration image data in the neural network 90 and enables the more accurate reconfiguration image data to be output from the neural network 90.

In the case of input of regular reflection light image data with regard to a non-defective packaged item 1, the eventually obtained AI model 100 generates reconfiguration image data that are substantially identical with the input regular reflection light image data. In the case of input of regular reflection light image data with regard to a defective packaged item 1, on the other hand, the AI model 100 generates reconfiguration image data that are substantially identical with the input regular reflection light image data excluding a noise portion (a portion corresponding to a damaged location in the packaging material 3). In other words, in the case of a defective packaging material 3 of the packaged item 1, virtual image data with regard to the packaged item 1 on the assumption that the packaging material 3 has no defective part (no damaged location), is generated as the reconfiguration image data with regard to the packaged item 1.

Figure 8:
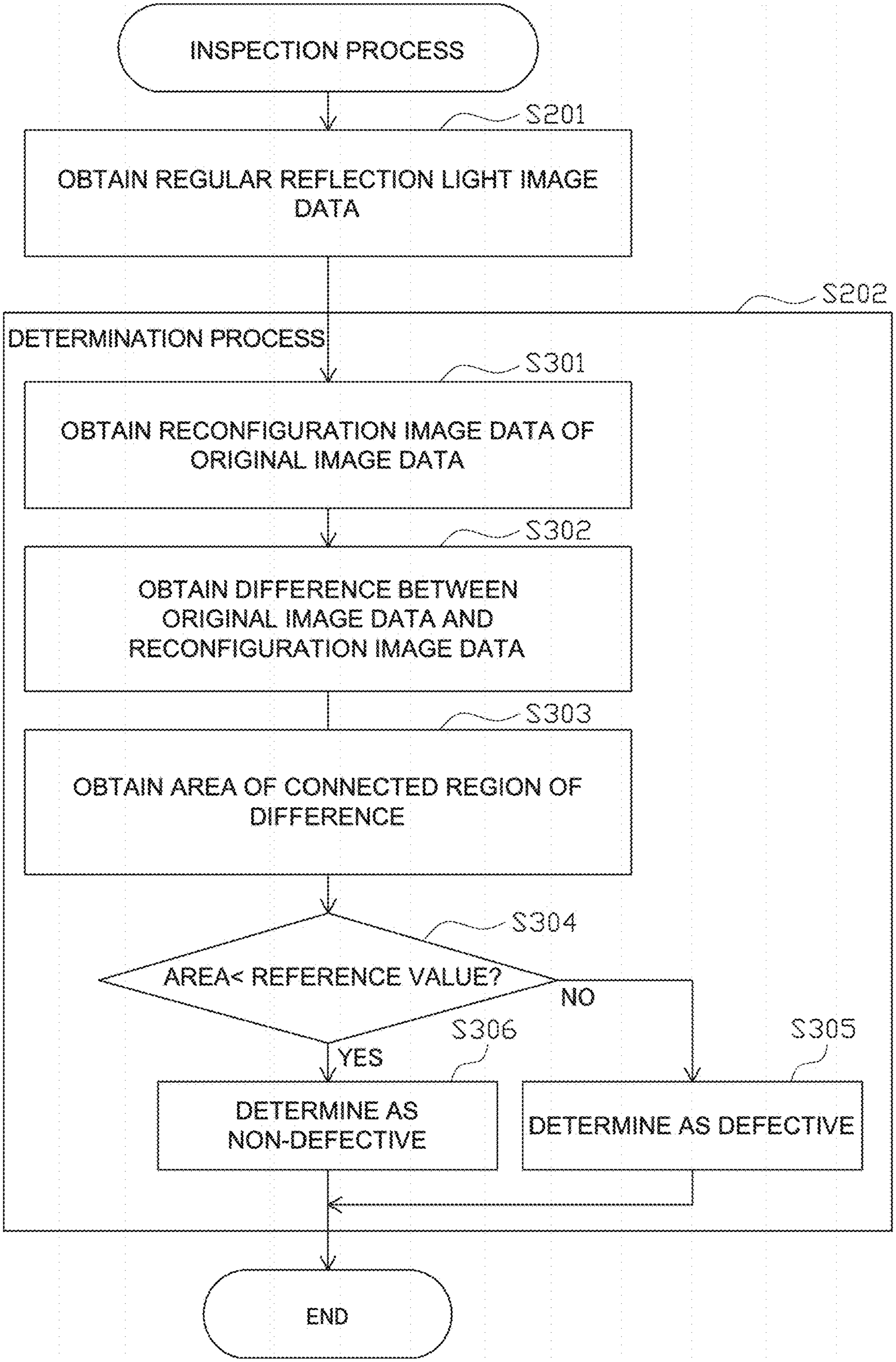
FIG. 8 is a flowchart showing the flow of an inspection process.

The following describes a process of good/poor quality judgment (inspection process) of the packaged item 1 (more specifically, the packaging material 3) performed by the determination system 20, with reference to the flowchart of FIG. 8. This inspection process is performed at an ordinary inspection process execution timing that is preset.

At step S201, the inspection process first causes the line sensor camera 13 to repeatedly perform imaging of ultraviolet light reflected from the packaged item 1 in the state that the packaged item 1 is irradiated with the ultraviolet light emitted from the illumination device 12, while the packaged item 1 is conveyed by the conveying device 11. The inspection process accordingly obtains a plurality of pieces of luminance image data with regard to the packaged item 1. The regular reflection light image data generator 24 then obtains regular reflection light image data with regard to the packaged item 1, based on these luminance image data.

The inspection process subsequently performs a determination process at step S202 to determine whether the packaging material 3 is defective or non-defective, based on the obtained regular reflection light image data. In the determination process, at step S301, the inspection module 26 first obtains reconfiguration image data by inputting the regular reflection light image data (original image data) obtained at step S201 into the AI model 100. According to the embodiment, the inspection module 26 configures the "reconfiguration image data obtaining unit".

At subsequent step S302, the inspection module 26 compares the regular reflection light image data as the original image data with the configuration image data and identifies a difference between these two image data. For example, the inspection module 26 compares pixels of identical coordinates in these two image data with each other and identifies pixels having differences in luminance equal to or greater than a predetermined value, as this difference. According to the embodiment, the inspection module 26 of comparing the original image data with the reconfiguration image data configures the "comparison unit".

At step S303, the inspection module 26 subsequently calculates the area (the number of pixels) of a connected region of this difference (i.e., a block of pixels having the differences in luminance equal to or greater than the predetermined value).

At step S304, the inspection module 26 then determines the presence or the absence of any damaged location (defective part) in the packaging material 3. More specifically, the inspection module 26 determines whether the area calculated at step S303 is greater than a predetermined reference value. When the calculated area is greater than the reference value, the inspection module 26 determines that the packaging material 3 is "defective" and thereby determines that the packaged item 1 is "defective" at step S305 and then terminates the inspection process. In the case of determination as "defective", a defective signal is output to the defective discharge mechanism described above.

When the calculated area is equal to or less than the reference value, on the other hand, the inspection module 26 determines that the packaging material 3 is "non-defective" and thereby determines that the packaged item 1 is "non-defective" at step S306 and then terminates the inspection process.

As described above, according to the embodiment, the outer surface of the object item to be packaged 2 is thought to be rougher than the outer surface of the packaging material 3. Accordingly, in the regular reflection light image data, a damaged location having a tear, a break or the like (a part where the outer surface of the object item to be packaged 2 is exposed) is relatively dark, whereas a normal location is relatively bright. The configuration of the embodiment determines whether the packaging material 3 in the packaged item 1 is defective or non-defective, based on such differences occurring in the regular reflection light image data. This configuration thus enables an inspection for the presence or the absence of any break, tear or the like in the packaging material 3 to be performed without using any special material having the ultraviolet absorbing function for the packaging material 3. This accordingly suppresses an increase in cost relating to manufacture of the product (the packaged item 1).

Furthermore, the configuration of the embodiment utilizes the regular reflection light image data, so as to provide a relatively large difference in contrast between the normal location and the damaged location in the packaging material 3 and more effectively prevent the occurrence of "blurring" at a boundary between the normal location and the damaged location. This configuration enables a sharp image for the inspection (the regular reflection light image data according to the embodiment) to be obtained more certainly and thereby ensures a detection of any break, tear or the like in the packaging material 3 with the higher accuracy.

Moreover, the configuration of the embodiment generates the regular reflection light image data by performing the process of setting the highest luminance value among a plurality of luminance values with regard to one identical location (one certain pixel in eventually obtained regular reflection light image data), which are respectively shown by a plurality of pieces of luminance image data, to the luminance of the one identical location (the one certain pixel), with respect to each of the pixels in the eventually obtained regular reflection light image data. This configuration thus enables the more accurate regular reflection light image data to be obtained relatively easily. This further improves the accuracy of the inspection for the packaging material 3.

Additionally, the configuration of the embodiment compares the regular reflection light image data (the original image data) with the reconfiguration image data that are reconfigured by inputting the original image data into the AI model 100 and determines whether the packaging material 3 is defective or non-defective, based on the results of the comparison. The two image data to be compared with each other pertain to the one identical packaged item 1. The two image data to be compared with each other accordingly have substantially identical shapes and appearances of the packaged item 1. This configuration does not need to set relatively loose determination conditions with the purpose of preventing false detection due to the differences in shape and appearance, but allows the stricter determination conditions to be set. Furthermore, this configuration enables identical conditions for obtaining image data (for example, the position and the angle of the packaged item 1 placed relative to the line sensor camera 13, the light/dark state, and the angle of view of the camera) to be set for the two image data to be compared with each other. As a result, this configuration achieves the extremely high accuracy of the inspection.

Furthermore, the configuration of the embodiment performs the good/poor quality judgment of the packaging material 3 as described above and thereby more certainly prevents a shadow caused by fine "crinkles" present even in a non-defective packaging material 3 from being falsely detected as a defective part. As a result, this furthermore improves the accuracy of the inspection.

The present disclosure is not limited to the description of the above embodiment but may be implemented, for example, by configurations described below. The present disclosure may also be naturally implemented by applications and modifications other than those illustrated below.

Figure 9:
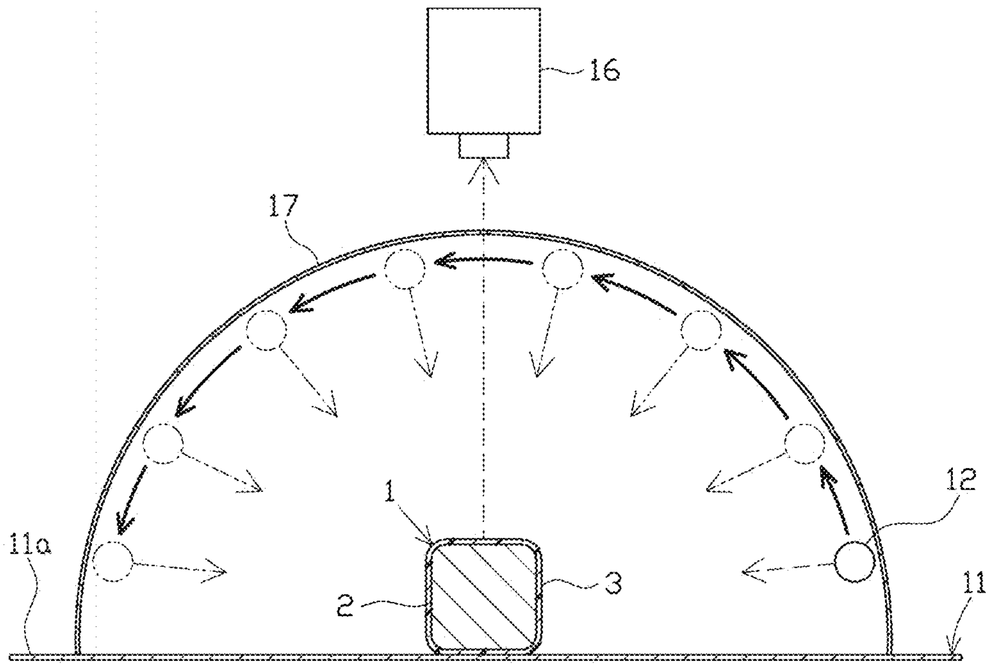
FIG. 9 is a partly broken schematic front view illustrating a packaged item inspection device provided with a movable illumination device according to another embodiment.

(a) The configuration of the embodiment described above causes the packaged item 1 to be conveyed by the conveying device 11 and thereby enables both the illumination device 12 and the imaging unit (the line sensor camera 13) to be moved relative to the packaged item 1. A modified configuration may, on the other hand, keep the packaged item 1 in the stopped state and may cause at least one of the illumination device 12 and the imaging unit (the line sensor camera 13) to be moved relative to the packaged item 1 by predetermined driving means. For example, as shown in FIG. 9, one modification may be configured to move the illumination device 12 along a predetermined arc-shaped route located around the packaged item 1. In this modified configuration, every time the illumination device 12 is moved by a predetermined distance, an area camera 16 serving as the "imaging unit" performs imaging of the ultraviolet light reflected from the packaged item 1. The area camera 16 takes images in a rectangular shape.

In this modified configuration described above, the regular reflection light image data are generated by the following procedure. The regular reflection light image data generator 24 obtains a highest luminance value among a plurality of luminance values with regard to one identical location (one certain pixel in eventually obtained regular reflection light image data), which are respectively shown by a plurality of pieces of luminance image data obtained by the area camera 16. For example, when each of eight luminance image data obtained by eight imaging operations has one pixel corresponding to the one certain pixel, the regular reflection light image data generator 24 obtains the highest luminance value among eight luminance values shown by these eight pixels.

The regular reflection light image data generator 24 subsequently performs a process of setting the obtained highest luminance value to the luminance of the one identical location described above (the one certain pixel in the eventually obtained regular reflection light image data), with respect to each of the pixels in the eventually obtained regular reflection light image data. As a result, this configuration generates the regular reflection light image data with regard to the packaged item 1.

Another modified configuration may include an ultraviolet light reflecting portion 17 in a tubular form placed to cover the moving route of the illumination device 12 from outside thereof. This modified configuration causes the ultraviolet light to be reflected from an inner surface of this ultraviolet light reflecting portion 17 and thereby enables the packaged item 1 to be irradiated more efficiently with the ultraviolet light. Another modification may be provided with the line sensor camera 13, in place of the area camera 16, to perform imaging of the reflected light from the packaged item 1, while moving the illumination device 12 and the packaged item 1.

Figure 10:
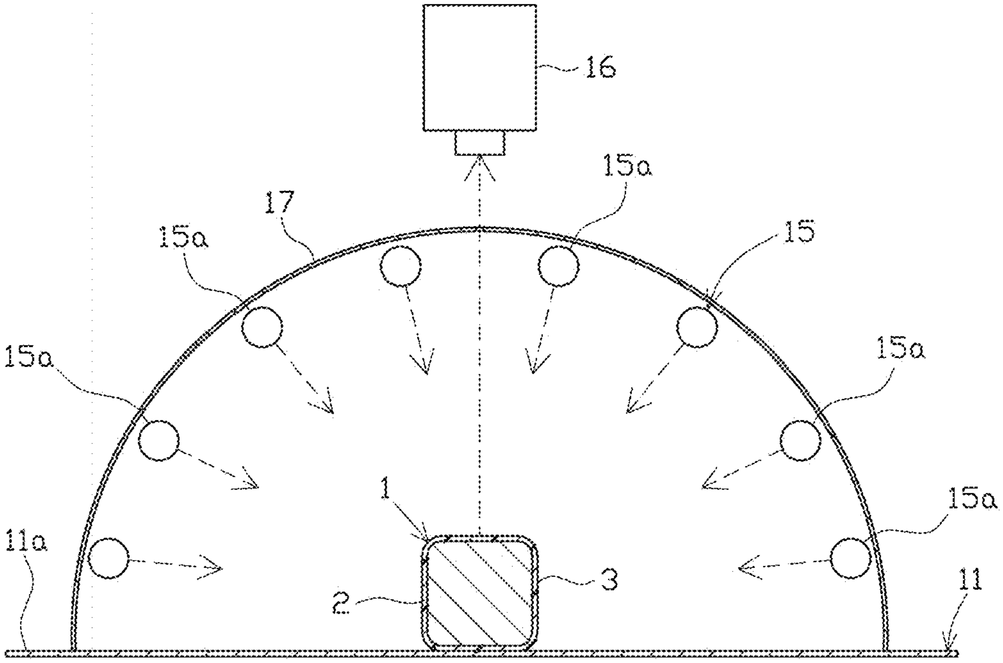
FIG. 10 is a partly broken schematic front view illustrating a packaged item inspection device provided with an illumination device configured by shadowless illumination according to another embodiment.

(b) As shown in FIG. 10, another modification may be provided with an illumination device 15 that serves as the "irradiation unit" and that is configured by shadowless illumination using a plurality of ultraviolet light sources 15*a* placed around the packaged item 1 and may also be provided with the area camera 16 that serves as the "imaging unit" and that performs imaging of the ultraviolet light reflected from the packaged item 1. In the case where a plurality of imaging operations are performed for one packaged item 1 in this modified configuration, position adjustment of the packaged item 1 and the like is performed to slightly change the position of the packaged item 1 relative to the illumination device 12 with every imaging operation The configuration of the illumination device 12 by shadowless illumination enables the regular reflection light image data with regard to the packaged item 1 to be obtained by a relatively small number of imaging operations (i.e., by using relatively small volume of luminance image data). This configuration reduces the processing load for obtaining the regular reflection light image data. This configuration also increases the speed of the inspection and thereby improves the productivity.

Furthermore, in the case where the object item to be packaged 2 is, for example, paper, vegetable, mushroom, meat, fish or the like and has a sufficiently low ultraviolet light reflectance on an outer surface thereof (i.e., in the case where the outer surface of the object item to be packaged 2 absorbs most of the ultraviolet light), the configuration of the illumination device 15 by shadowless illumination enables the regular reflection light image data to be obtained by an extremely small number of imaging operation (for example, by only one imaging operation). In the case where the regular reflection light image data is obtained by one imaging operation, the obtained regular reflection light image data is identical with luminance image data obtained by one imaging operation of the area camera 16. In this case, there is accordingly no need to perform the process of obtaining the regular reflection light image data from a plurality of pieces of luminance image data.

In the case where the illumination device 15 is configured by shadowless illumination, the ultraviolet light reflecting portion 17 in the tubular form may be provided such as to cover all the plurality of ultraviolet light sources 15*a* from outside thereof and such as to cause the ultraviolet light to be reflected by an inner surface of the ultraviolet light reflecting portion 17. This configuration enables the packaged item 1 to be irradiated more efficiently with the ultraviolet light. Another modification may be provided with the line sensor camera 13, in place of the area camera 16, to perform imaging of the reflected light from the packaged item 1, while moving the packaged item 1.

(c) According to the embodiment described above, the inspection module 26 is configured to compare the regular reflection light image data (the original image data) with the reconfiguration image data by using the AI model 100 and thereby to determine whether the packaging material 3 is defective or non-defective. According to a modification, on the other hand, the inspection module 26 may be configured to determine whether the packaging material 3 is defective or non-defective, based on a binarized image that is obtained by processing the regular reflection light image data by a binarization process.

Figure 11:
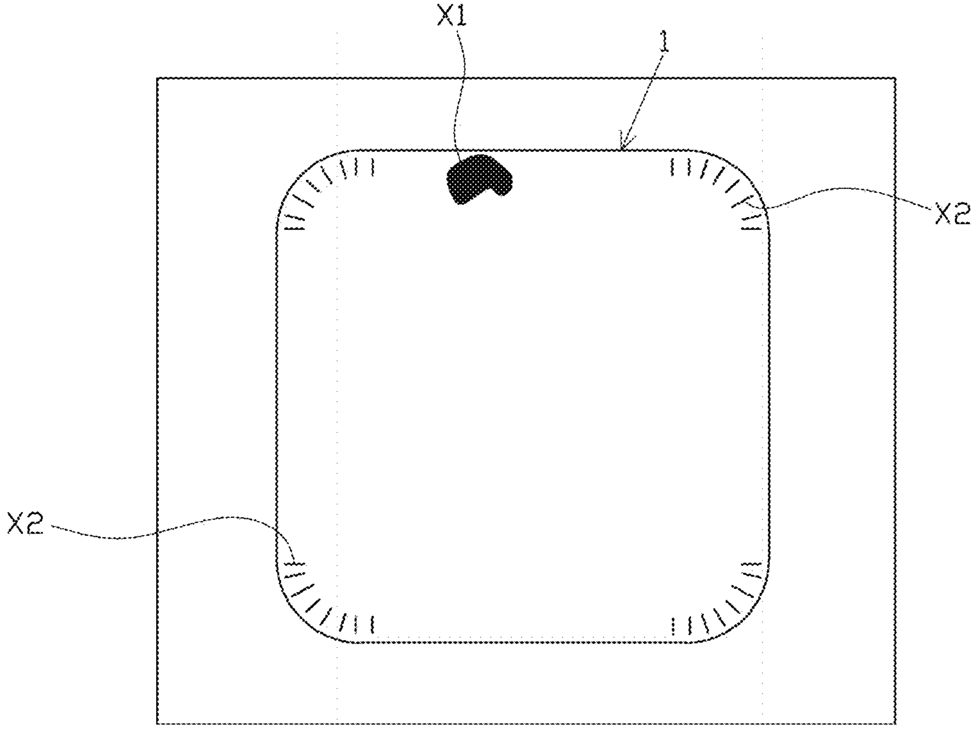
FIG. 11 is a schematic view illustrating binarized image data according to another embodiment.

More specifically, the inspection module 26 uses a predetermined binarization reference value to process the regular reflection light image data by a binarization process and thereby obtain binarized image data. For example, the inspection module 26 obtains binarized image data that identifies pixels having the luminance equal to or higher than the binarization reference value as "1 (bright portion)", while identifying pixels having the luminance lower than the binarization reference value as "0 (dark portion)". A damaged location X1 where a break, a tear or the like occurs and a shadow X2 caused by fine "crinkles" are shown as dark portions in the obtained binarized image data (as shown in FIG. 11). The inspection module 26 then calculates the area (the number of pixels) of a connected region of the dark portion in the binarized image data. When the calculated area is greater than a preset reference value, the inspection module 26 detects the presence of a break, a tear or the like in the packaging material 3 and determines that the packaging material 3 is "defective". When the calculated area is equal to or less than the reference value, on the other hand, the inspection module 26 determines that the packaging material 3 is "non-defective".

The configuration of performing the good/poor quality judgment by utilizing the area of the connected region of the dark portion as described above more reliably prevents the shadow X2 caused by the fine "crinkles" that are present even in a non-defective packaging material 3 from being falsely detected as a defective part. As a result, this configuration furthermore improves the accuracy of the inspection.

(d) The configuration of the above embodiment utilizes the area of the connected region to perform the good/poor quality judgment of the packaging material 3. A modified configuration may, on the other hand, utilize the length of the connected region to perform the good/poor quality judgment of the packaging material 3. For example, in the case where the length of the connected region is greater than a predetermined reference value or in the case where there are a predetermined number of or a larger number of connected regions having the lengths exceeding a reference value, this modified configuration may determine that the packaging material 3 has a tear or a break and may thus determine that the packaging material 3 is "defective".

This modified configuration of utilizing the length of the connected region may be applied to the good/poor quality judgment process using the binarized image data as described above in (c).

(e) The configuration of the above embodiment performs the good/poor quality judgment of the packaging material 3, based on the state of the packaging material 3 itself. A modified configuration may, on the other hand, perform the good/poor quality judgment of the packaging material 3, based on the state of the packaging material 3 relative to the object item to be packaged 2. For example, in the case where part of the object item to be packaged 2 is partly wrapped with the packaging material 3, this modified configuration may perform the good/poor quality judgment of the packaging material 3, based on the relative position of the packaging material 3 to the object item to be packaged 2.

(f) The configuration of the AI model 100 (the neural network 90 that has been trained) serving as the "identification unit" and the learning method thereof are not limited to those of the embodiment described above. For example, a modified configuration may process a variety of data by a normalization process or the like as needed basis in the course of a learning process of the neural network 90 or in the course of a process of obtaining the reconfiguration image data. Moreover, the configuration of the neural network 90 is not limited to the structure shown in FIG. 6 but may be provided with a pooling layer subsequent to the convolution layer 93. A modified configuration may employ, for example, a different number of layers in the neural network 90, a different number of nodes in each layer, and a different connecting structure of the respective nodes.

Furthermore, according to the embodiment described above, the AI model 100 (the neural network 90 that has been trained) is the generation model having the configuration of the convolutional autoencoder (CAE). This configuration is, however, not restrictive. The AI model 100 (the neural network 90 that has been trained) may be a generation model having the configuration of a different type of autoencoder, for example, a variational autoencoder (VAE).

The above embodiment is configured to perform learning of the neural network 90 by the error backpropagation method. This configuration is, however, not restrictive. Learning of the neural network 90 may be performed by using any of various other learning algorithms.

Moreover, the neural network 90 may be configured by a dedicated AI processing circuit, such as an AI chip. In this case, only learning information such as parameters may be stored in the storage portion 20*c*. In this modification, the AI model 100 may be configured by setting the learning information, which is read out by the dedicated AI processing circuit, in the neural network 90.

Additionally, according to the embodiment described above, the determination system 20 includes the learning module 25 and is configured to perform learning of the neural network 90 inside of the determination system 20. This configuration is, however, not restrictive. For example, a modified configuration may exclude the learning module 25 and may cause learning of the neural network 90 to be performed outside of the determination system 20. This modified configuration may store the AI model 100 that has been learnt outside (the learnt neural network 90 that has been trained) into the storage portion 20*c*.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . packaged item, 2 . . . object item to be packaged, 3 . . . packaging material, 10 . . . packaged item inspection device, 12, 15 . . . illumination device (irradiation unit), 13 . . . line sensor camera (imaging unit), 16 . . . area camera (imaging unit), 24 . . . regular reflection light image data generator (regular reflection light image data generation unit), 26 . . . inspection module (determination unit, reconfiguration image data obtaining unit, comparison unit), 91 . . . encoder portion (encoding unit), 92 . . . decoder portion (decoding unit), 100 . . . AI model (identification unit)

What is claimed is:

1. A packaged item inspection device that inspects a packaged item obtained by shrink wrapping or stretch-wrapping an object item with packaging material made of thermoplastic resin material, the object item having an outer surface rougher than an outer surface of the packaging material, the packaged item inspection device comprising:

an illumination device that irradiates the packaged item with ultraviolet light;

an imaging device that images the ultraviolet light reflected from the packaged item and obtains regular reflection light image data of the packaged item; and a hardware processor that determines whether the packaging material in the packaged item is defective or non-defective, based on the regular reflection light image data, depending on presence or absence of any tear or break in the packaging material, wherein the hardware processor further:

processes the regular reflection light image data by a binarization process and thereby obtains binarized image data, and upon determining that an area of a connected region of a dark portion in the binarized image data is greater than a preset reference value, outputs a result of determination indicating that the packaging material is defective due to the presence of the tear or break.

2. The packaged item inspection device according to claim 1, wherein at least one of the illumination device and the imaging device is movable relative to the packaged item, the imaging device images the packaged item multiple times while at least one of the illumination device and the imaging device is moving relative to the packaged item, and thereby obtains pieces of luminance image data including information on luminance values at locations in the packaged item, and the hardware processor sets, as a luminance value of each of the locations in the packaged item, a highest luminance value among luminance values at an identical location in the packaged item indicated by the pieces of luminance image data, and generates the regular reflection light image data using the set luminance value.

3. The packaged item inspection device according to claim 1, wherein the illumination device is shadowless illumination having ultraviolet light sources.

4. The packaged item inspection device according to claim 1, further comprises:

a neural network that comprises an encoder portion extracting a feature quantity from input image data, and a decoder portion reconfiguring image data from the feature quantity; and a generation model generated by training the neural network using, as learning data, the regular reflection light image data with regard to a non-defective packaged item, wherein the hardware processor further:

obtains reconfiguration image data that are image data reconfigured by inputting, as original image data, the regular reflection light image data obtained by the imaging device into the generation model; and outputs a result of determination as to whether the packaging material is defective or non-defective based on a result of comparison between the original image data and the reconfiguration image data.

5. A packaged item inspection method of inspecting a packaged item obtained by shrink-wrapping or stretch-wrapping an object item with packaging material made of thermoplastic resin material, the object item having an outer surface rougher than an outer surface of the packaging material, the packaged item inspection method comprising:

irradiating the packaged item with ultraviolet light;

imaging the ultraviolet light reflected from the packaged item and obtaining regular reflection light image data of the packaged item; and determining whether the packaging material in the packaged item is defective or non-defective, based on the regular reflection light image data, depending on presence or absence of any tear or break in the packaging material, wherein the determining further includes:

processing the regular reflection light image data by a binarization process and thereby obtaining binarized image data, and upon determining that an area of a connected region of a dark portion in the binarized image data is greater than a preset reference value, outputting a result of determination indicating that the packaging material is defective due to the presence of the tear or break.

* * * * *